United States Patent [19]

Nemeth

[11] Patent Number: 4,735,309

[45] Date of Patent: Apr. 5, 1988

[54] COMPUTER DISK BOX

[75] Inventor: Brad Nemeth, San Francisco, Calif.

[73] Assignee: Wendell R. Brooks, Inc., Fort Worth, Tex.

[21] Appl. No.: 23,647

[22] Filed: Mar. 9, 1987

[51] Int. Cl.⁴ .................. B65D 85/57; B65D 43/16
[52] U.S. Cl. ................................ 206/309; 206/444; 220/333; 220/339
[58] Field of Search ............. 206/309, 444; 220/329, 220/331, 332, 333, 335, 339; 312/329, 109, 138 R; 160/84 R, 207

[56] References Cited

U.S. PATENT DOCUMENTS

| | | | |
|---|---|---|---|
| 963,769 | 7/1910 | Johnson et al. | 220/333 |
| 1,120,872 | 12/1914 | Weis | 206/309 X |
| 1,431,288 | 10/1922 | Corder | 220/333 |
| 1,997,043 | 4/1935 | Clark | 220/333 X |
| 2,798,246 | 7/1957 | Holloway | 160/84 R X |
| 3,127,225 | 3/1964 | Oehriein | 220/339 X |
| 3,986,749 | 10/1976 | Hull et al. | 160/84 R X |
| 4,347,537 | 8/1982 | Schoettle et al. | 220/339 X |
| 4,356,918 | 11/1982 | Kahle et al. | 206/444 |
| 4,369,879 | 1/1983 | Egly et al. | 206/444 X |
| 4,478,335 | 10/1984 | Long et al. | 206/444 |
| 4,479,577 | 10/1984 | Eichner et al. | 206/444 X |
| 4,498,583 | 2/1985 | Long et al. | 206/444 |
| 4,508,217 | 4/1985 | Long et al. | 206/444 X |
| 4,527,692 | 7/1985 | Neuman | 206/444 |
| 4,541,527 | 9/1985 | Nagel | 206/444 X |
| 4,546,898 | 10/1985 | Ekuan | 206/444 X |
| 4,586,603 | 5/1986 | Long et al. | 206/444 X |
| 4,678,080 | 7/1987 | Nelson | 206/444 X |

FOREIGN PATENT DOCUMENTS

| | | | |
|---|---|---|---|
| 2174075 | 10/1986 | United Kingdom | 206/444 |
| 2174978 | 11/1986 | United Kingdom | 206/444 |

Primary Examiner—Stephen Marcus
Assistant Examiner—T. Graveline
Attorney, Agent, or Firm—James E. Bradley

[57] ABSTRACT

A box is particularly used for holding computer disks. The box has a back wall, a bottom wall, sidewalls and a front wall. The front wall has lower, middle, and upper panels connected by hinges. The top wall is connected to the upper panel. The front wall is secured through the sidewalls by a pin that allows the front wall to fold between open and closed positions. In the open position, the lower panel and the upper panel are parallel with the bottom wall.

16 Claims, 2 Drawing Sheets

COMPUTER DISK BOX

BACKGROUND OF THE INVENTION

1. Field of the Invention:

This invention relates in general to containers, and in particular to a box for storing computer floppy disks.

2. Description of the Prior Art:

Most small computers use floppy disk drives. The drives use thin flexible disks for magnetically storing and retrieving information. Most computer users will have a number of disks containing programs and data. Blank disks are sold in boxes which can be used also for storing the disks. Also, special purpose boxes and holders are used for storing the disks.

Most boxes available are either of cardboard or plastic. The plastic boxes are normally two piece construction with a lid portion that pivots open. The two piece plastic boxes currently available require molding two separate components, then assembling the product.

SUMMARY OF THE INVENTION

The box of this invention has a back wall, a bottom wall, and a pair of side walls, all integrally joined together. A front wall has lower, middle and upper panels. The panels are connected to each other by integrally formed plastic hinges.

A top wall is rigidly joined to the upper panel or front. Pin means mounted between each sidewall and a front wall enables the front wall to move between a closed position and an open position. In the closed position, all panels are parallel to each other and with the back wall. The top wall is parallel with the bottom wall. In the open position, the upper edge of the lower panel folds forward, the upper edge of the middle panel folds rearward relative to its lower edge, and the top wall moves forward with the upper panel. This exposes the contents of the box.

DESCRIPTION OF THE PREFERRED EMBODIMENT

Figure 2:
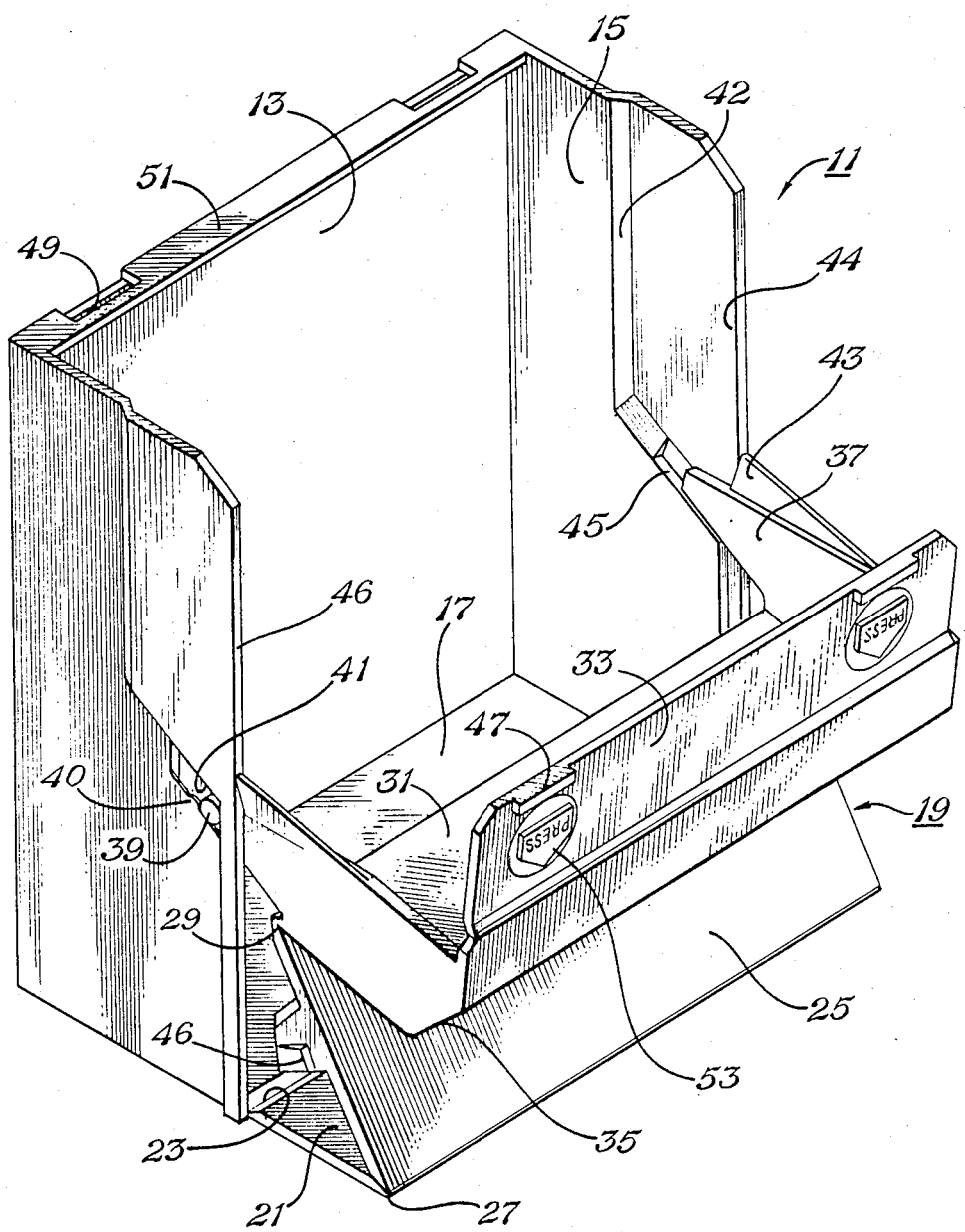
FIG. 2 is a isometric view of the box of FIG. 1, and shown in the open position.

Referring to the FIG. 2, box 11 has a back wall 13, side walls 15 and a bottom wall 17. The side walls 15 are parallel to each other and perpendicular to the back wall 13. The bottom wall 17 is perpendicular to the side walls 15 and the back wall 13. The back wall 13, side walls 15 and bottom wall 17 are molded rigidly together in the rectangular configuration shown.

A front wall 19 has a lower panel 21 that is joined to the bottom wall 17 by a lower hinge 23. Front wall 19 also has a middle panel 25 located above the lower panel 21 and joined to the lower panel 21 by a middle hinge 27. An upper panel 31 is located above the middle panel 25 and joined by an upper hinge 29. A top wall 33 is rigidly joined to the upper panel 31. Top wall 33 position is perpendicular to the upper panel 31, and is joined to the upper panel 31 by a beveled section 35.

A pair of tabs 37 are formed on opposite sides of the upper panel 31. The tabs 37 are parallel to each other and perpendicular to the upper panel 31. The tabs 37 join the top wall 33 on the upper end and extend below the upper hinge 29 when the front wall 19 is in the closed position of FIG. 1. An outward facing pin 39 is formed on each lower end of the tabs 37.

The pins 39 locate in elongated slots 41 extending through the side walls 15. Each slot 41 inclines downward and forward. The rearward end of each slot 41 is located higher than the forward end of each slot 41. The pins 39 are smaller in diameter than the length of the slots 41, enabling the pins 39 to slide along the slots 41 between a rearward position shown in FIG. 1 and a forward position shown in FIG. 2. A protuberance 40 is located on the lower edge of slot 41, about midway along its length. The pins 39 will snap forward of the protuberances 40 when the box 11 is open and will be retained in the forward position by the protuberances 40. In the closed position, the pins 39 snap rearward of the protuberances 40, which will then retain the pins 39 in the rearward position.

Each tab 37 has mounted on its rearward or upper edge a web 43. Each web 43 inclines outward, and when the box 11 is in the closed position, will frictionally engage a recessed portion 44 formed on the inside of each side wall 15. Each web 43 is resilient, and when box 11 is in the open position, they will spring outward and abut against the forward edge 48 of the recessed portion 44. As shown in FIG. 2, this contact of the webs 43 retains the box 11 in the open position. The lower end of each recessed portion 44 terminates in an inclined shoulder 45. The shoulder 45 serves as a stop means for supporting the tabs 37 in the open position shown in FIG. 2. The rearward end of each recessed portion 44 is a vertical shoulder 42. The upper or rearward edge of each web 43 contacts the shoulder 42 when the front wall 19 is in the closed position of FIG. 1.

A pair of lugs 46 are mounted to the outer edges of the middle panel 25. Each lug 46 is located on an edge of the middle panel 25 and extends rearward from the middle panel 25. Each lug 46 is positioned to locate in the slot 41 along with the pin 39, when in the closed position shown in FIG. 1. The lugs 46 serve as a lower lock means for retaining the middle panel 25 in the closed position shown in FIG. 1.

Upper lock means for retaining the top wall 33 in the closed position includes a pair of tabs 47. Each tab 47 extends upward from the top wall 33 and is located on the rearward edge of the top wall 33. A pair of apertures 49 are located in a flange 51 formed at the top of the back wall 13. The tabs 47 locate in the apertures 49 when the top wall 33 is in the closed position shown in FIG. 1.

Figure 1:
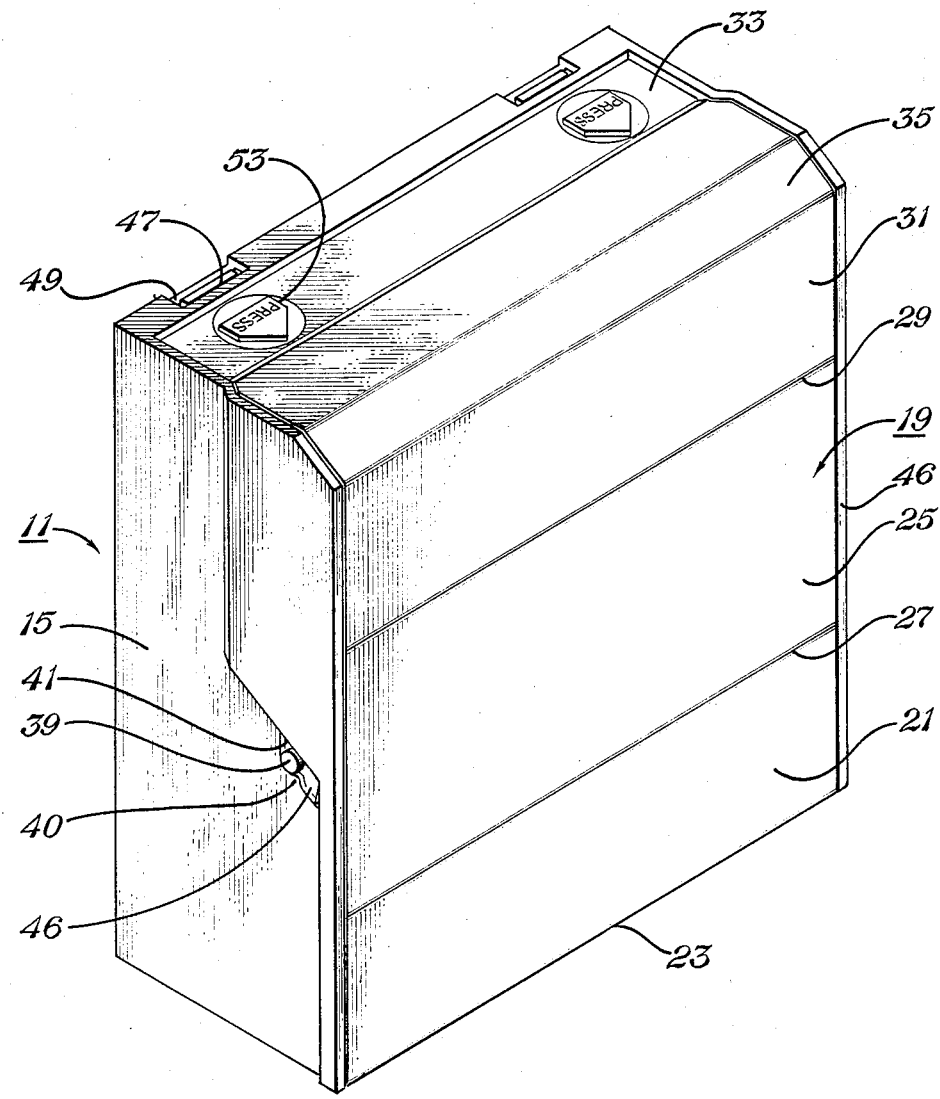
FIG. 1 is an isometric view of a box constructed in accordance with this invention and shown in the closed position.

In operation, while in the closed position, the panels 21, 25 and 31 will be coplanar and parallel with the back wall 13 as shown in FIG. 1. The top wall 33 will be parallel with the bottom wall 17. The lugs 46 will be located in the slots 41 forward of the pins 39 and forward of the protuberances 40. Each pin 39 will be at the upper rearward edge of slot 41, rearward of a protuberance 40. The tabs 47 will be located in the apertures 49. Tabs 37, shown in FIG. 2, will be located in the recessed portion 44, with the edge of each web 43 in contact with shoulder 42.

To open the box 11, the user presses downward on the top wall 33 at the symbols 53. This causes the top wall 33 to move downward and the tabs 47 to disengage from the apertures 49. The pins 39 will move downward and forward in the slots 41, snapping past the protuberances 40 and remaining there while the box 11 is in the open position. The forward movement of pins 39 pushes the middle hinge 27 forward, causing the lower panel 21 to begin to fold forward and downward. The lugs 46 detach from the slots 41 and move forward of the side walls 15. The user continues to push downward and forward on the top wall 33, causing the upper panel 31 to fold downward and forward to the position shown in FIG. 2. The tabs 37 will contact the shoulders 45 when the front wall 19 is fully open as shown in FIG. 2. Webs 43 will spring outward, and their rearward edges will abut against edges 48.

When in the fully open position, the lower panel 21 will be coplanar with the bottom wall 17. The lower hinge 23 will have folded 90 degrees from the 90 degree position shown in FIG. 1 to a 180 degree position shown in FIG. 2, measured between the bottom wall 17 and the lower panel 21. The middle panel 25 will be inclining rearward in the embodiment shown. That is, the middle hinge 27 will be located farther forward than the upper hinge 29. The middle hinge 27 will have folded in the embodiment shown somewhat more than 90 degrees from a 180 degree position shown in FIG. 1 to an acute angle position, measured between the lower panel 21 and middle panel 25.

The upper hinge 29 will have moved forward of the side walls 15. In the embodiment shown, the upper hinge 29 will have folded somewhat more than 90 degrees from the 180 degree position shown in FIG. 1 to an acute angle position measured between the middle panel 25 and the upper panel 31. The upper panel 31 will be substantially parallel with the lower panel 21. The top wall 33 will be substantially parallel with the back wall 13.

With changes in lengths of the panels 21, 25, and 31, the middle panel 25 could fold to a position substantially parallel with the back wall 13. In that case, the angle between the lower panel 21 and middle panel 25 in the open position would be 90 degrees. Also, the angle between the middle panel 25 and the upper panel 31 in the open position would be 90 degrees in such a case, rather than acute. Even with changes in lengths of the panels 21, 25, and 31, the angles between the lower panel 21 and the middle panel 25 and the middle panel 25 and the upper panel 31, when open, will be less than obtuse.

In the open position, the computer disks (not shown) stored inside the box 11 will be readily accessible. Also, if desired, the disks can be stacked on the top surfaces of the webs 43 and tabs 37 in contact with the top wall 33 and leaning against the forward sides of the remaining disks in the box 11.

To close the box, the user pushes the webs 43 inward toward each other to clear the edges 48 and pushes the top wall 33 upward and rearward until the tabs 47 engage the apertures 49. A secondary push on the middle panel 25 causes the lugs 46 to snap into the slots 41 and the pins 39 to be pushed back past the protuberances 40 to their rearward position. The pins 39, along with lugs 46 and tabs 47 serve as retainer means to retain the front wall 19 and allow the movement between the open and closed positions.

The box 11 is formed of plastic, preferably polypropylene. Box 11 is molded into a single piece. The hinges 23, 27 and 29 are integrally formed with the box 11 during molding. After it is molded, the pins 39 are pushed into the slots 41 and the box 11 is ready for use.

The invention has significant advantages. The box is of a single piece construction, which can save in manufacturing costs. The box is readily moved between open and closed positions. The hinges do not fold to a great degree between the open and closed positions, providing a long life for the hinges. The lower front panel adds stability to the box when in the open position. The disks are easily accessible with one hand while the box is in the open position.

While the invention has been shown in only one of its forms, it should be apparent to those skilled in the art that it is not so limited, but is susceptible to various changes without departing from the scope of the invention.

I claim:

1. A box, comprising in combination:
   a back wall;
   a bottom wall extending perpendicular to and forward from a lower edge of the back wall;
   a pair of sidewalls joining the back and bottom walls on each side, the sidewalls being parallel to each other and perpendicular to the back wall;
   a front wall having lower, middle and upper panels, the lower panel being connected to a forward edge of the bottom wall by a lower hinge, the middle panel being connected to the lower panel by a middle hinge, and the upper panel being connected to the middle panel by an upper hinge;
   a top wall rigidly mounted to the upper panel perpendicular to the upper panel; and
   retainer means mounted between each sidewall and the front wall for causing the front wall to move between a closed position in which the panels are coplanar with each other and parallel to the back wall and the top wall parallel with the bottom wall, to an open position in which the upper edge of the lower panel folds forward and downward, both upper and lower edges of the middle panel move forward, and the top wall moves forward and downward with the upper panel to expose the interior of the box.

2. The box according to claim 1 wherein the retainer means comprises:
   a pair of tabs, each mounted to opposite side edges of the upper panel;
   a pin mounted to each tab and engaging a slot formed on each sidewall.

3. The box according to claim 2 wherein each slot is elongated to allow the pins to move between forward and rearward positions, as the front wall moves between the closed position and the open position, respectively, and further comprising a protuberance located in each slot to releasably retain the pins in the forward and rearward positions.

4. The box according to claim 1 wherein the retainer means includes:
   upper lock means for releasably securing the upper panel in the closed position; and
   lower lock means for releasably securing the middle panel in the closed position.

5. A box, comprising in combination:
   a back wall;
   a bottom wall extending forward from a lower edge of the back wall, the bottom wall being rigidly joined to and perpendicular to the back wall;
   a pair of sidewalls rigidly joined to the back and bottom walls on each side, the side walls being parallel to each other and perpendicular to the back wall;

a front wall having lower, middle and upper panels, the lower panel being connected to the bottom wall by a lower hinge, the middle panel being connected to the lower panel by a middle hinge, and the upper panel being connected to the middle panel by an upper hinge;

a top wall rigidly mounted to the upper panel and extending perpendicular to the upper panel;

a pair of tabs, each rigidly mounted on opposite edges of the upper panel;

a pin mounted to each tab and engaging a slot formed in each sidewall, enabling the front wall to move between a closed position in which the panels are coplanar with each other and parallel to the back wall and the top wall is parallel with the bottom wall, to an open position in which the lower panel folds along the lower hinge forward and downward, the entire middle panel moves forward, and the upper panel folds along the upper hinge forward and downward;

the tabs extending below the upper hinge when the front wall is in the closed position, causing the upper hinge to move forward relative to the sidewalls when the front wall is in the open position; and lock means for releasably securing the front wall in the closed position.

6. The box according to claim 5 wherein the lower hinge allows the lower panel to move from a position perpendicular to the bottom wall to a position coplanar with the bottom wall, when the front wall is in the open position.

7. The box according to claim 5 wherein the middle hinge allows the middle panel to fold from a position parallel with the lower panel to a position forming an angle less than obtuse between the lower and middle panels when the front wall is in the open position.

8. The box according to claim 5 wherein the upper hinge allows the upper panel to fold from a position parallel with the middle panel to a position forming an angle less than obtuse between the upper and middle panels when the front wall is in the open position.

9. The box according to claim 5 wherein the box is formed of plastic, and the hinges are integrally formed with the box.

10. A box, comprising in combination:

a back wall;

a bottom wall extending forward from a lower edge of the back wall, the bottom wall being rigidly joined to and perpendicular to the back wall;

a pair of sidewalls rigidly joined to the back and bottom walls on each side, the side walls being parallel to each other and perpendicular to the back wall;

a front wall having lower, middle, and upper panels and movable between a closed position wherein the panels are coplanar with each other and parallel to the back wall to an open position;

a top wall rigidly mounted to the upper panel and extending perpendicular to the upper wall;

a pair of tabs, each rigidly mounted to an opposite edge of the upper panel on a rearward side of the upper panel;

a pin mounted to each tab and engaging a slot formed on each side wall, the slot being elongated and inclined with the lower end of the slot being located forward of the upper end of the slot;

hinge means interconnecting the panels, having upper, middle and lower hinges, for causing when the top wall is pressed downward the pins to move forward and downward in the slot, the middle hinge to move forward, the lower panel to fold along the lower hinge to a position coplanar with the bottom wall, the middle panel and the upper hinge to move forward, and the upper panel to fold forward along the upper hinge, defining the open position;

a pair of lugs, each mounted to opposite sides of the front wall and extending rearward for frictionally engaging one of the side walls to releasably retain the middle panel in the closed position; and upper lock means mounted to the upper panel for releasably retaining the upper panel in the closed position.

11. The box according to claim 10 wherein the lugs are mounted to the middle panel.

12. The box according to claim 10 wherein the upper lock means comprises a pair of upper tabs mounted to the top wall and positioned to engage a pair of apertures formed at the upper edge of the back wall.

13. The box according to claim 10, further comprising:

stop means on each sidewall for supporting the tabs and the upper panel when the front wall is in the open position.

14. The box according to claim 10, further comprising:

stop means on each sidewall for supporting the tabs when the front wall is in the open position, and for supporting the upper panel substantially parallel with the bottom wall when the front wall is in the open position.

15. The box according to claim 10 wherein the lugs locate within the slots along with the pins while the front wall is in the closed position.

16. The box according to claim 10 further comprising means comprising a protuberance located in each slot for releasably retaining the pins rearward in the slot while the front wall is in the closed position, and for releasably retaining the pins forward in the slot while the front wall is in the open position.

* * * * *